United States Patent
Yamano et al.

(10) Patent No.: US 8,050,195 B2
(45) Date of Patent: Nov. 1, 2011

(54) TRAFFIC PERFORMANCE EVALUATION SYSTEM IN WIRELESS NETWORK AND METHOD THEREOF

(75) Inventors: Satoru Yamano, Tokyo (JP); Huanxu Pan, Tokyo (JP)

(73) Assignee: NEC Corporation, Tokyo (JP)

( * ) Notice: Subject to any disclaimer, the term of this patent is extended or adjusted under 35 U.S.C. 154(b) by 168 days.

(21) Appl. No.: 12/369,085

(22) Filed: Feb. 11, 2009

(65) Prior Publication Data

US 2009/0201829 A1    Aug. 13, 2009

(30) Foreign Application Priority Data

Feb. 12, 2008    (JP) .................................. 2008-029911

(51) Int. Cl.
*H04L 12/28* (2006.01)

(52) U.S. Cl. ........ 370/255; 370/310; 370/252; 370/408; 370/445; 455/423; 709/224; 709/252

(58) Field of Classification Search .................. 370/241, 370/241.1, 244, 245, 250, 235, 236.1, 236.2, 370/252, 253, 331–334, 338, 337, 344, 347, 370/348, 445–448, 254, 255, 310, 408; 709/223–225, 235, 252; 455/7, 423, 453, 455/502, 522, 574

See application file for complete search history.

(56) References Cited

U.S. PATENT DOCUMENTS

| | | | |
|---|---|---|---|
| 6,996,064 B2* | 2/2006 | Klassen et al. | 370/252 |
| 7,200,149 B1* | 4/2007 | Hasty, Jr. | 370/255 |
| 7,489,650 B2* | 2/2009 | Ginzburg et al. | 370/252 |
| 7,711,008 B2* | 5/2010 | Jones et al. | 370/252 |
| 7,738,374 B2* | 6/2010 | Yagyu et al. | 455/453 |
| 2004/0174829 A1* | 9/2004 | Ayyagari | 370/254 |
| 2006/0023638 A1* | 2/2006 | Monaco et al. | 370/252 |
| 2007/0242621 A1* | 10/2007 | Nandagopalan et al. | 370/445 |
| 2008/0225717 A1* | 9/2008 | Chen et al. | 370/235 |

FOREIGN PATENT DOCUMENTS

| | | |
|---|---|---|
| JP | 2003244161 A | 8/2003 |
| JP | 2005210684 A | 8/2005 |
| JP | 2006197483 A | 7/2006 |
| JP | 2007074193 A | 3/2007 |

OTHER PUBLICATIONS

Keiichi et al., "A proposal for synchronous MBS transmission in MR", IEEE 802.16 Broadband Wireless Access Working Group, Jan. 18, 2007, pp. 1-6.*

* cited by examiner

*Primary Examiner* — Kwang B Yao
*Assistant Examiner* — Jeffrey M Rutkowski

(57) ABSTRACT

A traffic performance in a tree type multi-hop wireless network of a CSMA/CA method is evaluated easily and highly precisely. A traffic performance evaluation system in the multi-hop wireless network includes: a performance index estimation unit regarding the multi-hop wireless network as a combination of a plurality of single-hop wireless networks and estimating a traffic performance index around each node of the network; and a performance index determination unit determining a traffic performance index of the whole multi-hop wireless network based on an estimation result of all the nodes by the performance index estimation unit.

8 Claims, 8 Drawing Sheets

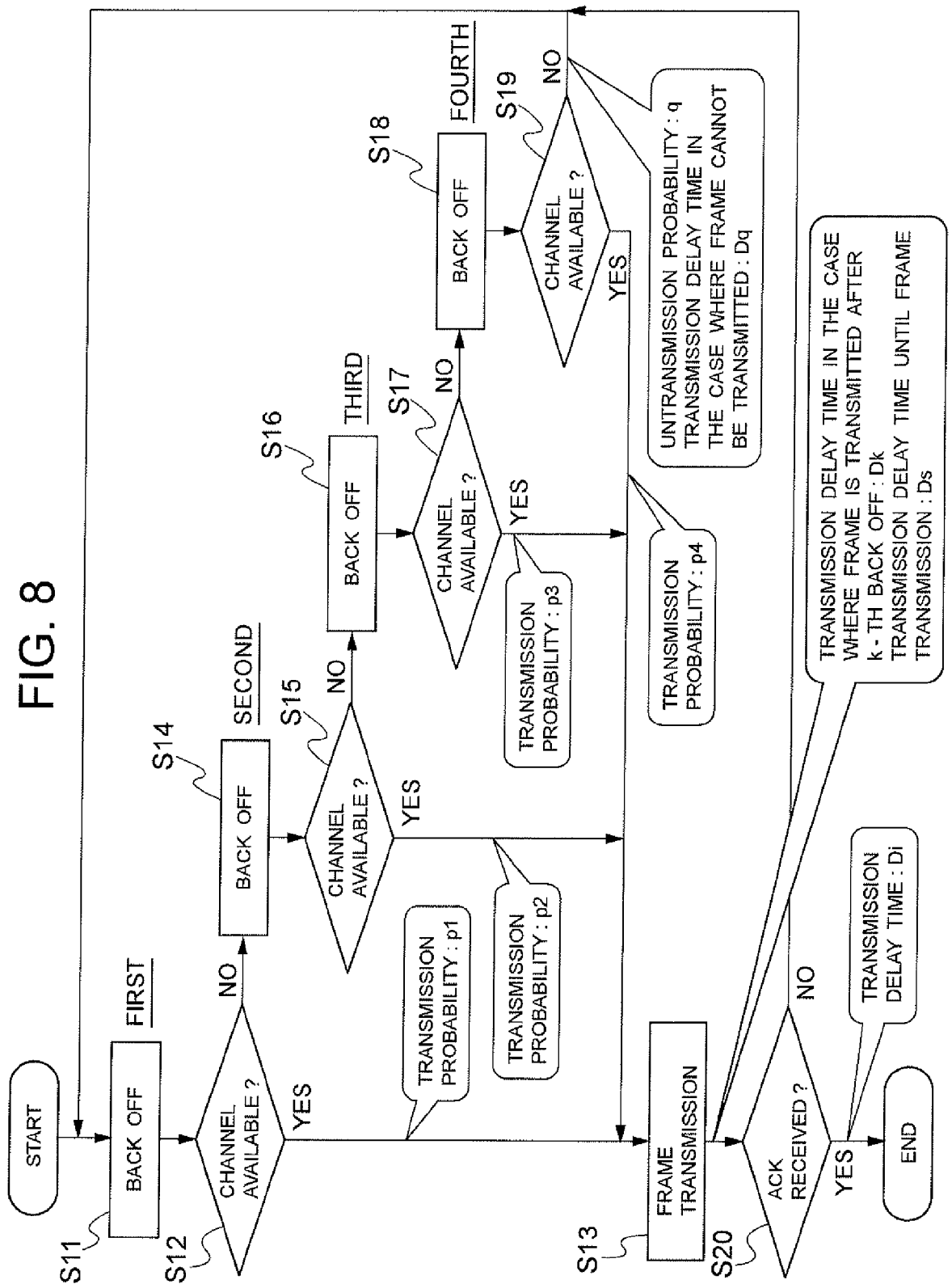

TRAFFIC PERFORMANCE EVALUATION SYSTEM IN WIRELESS NETWORK AND METHOD THEREOF

INCORPORATION BY REFERENCE

This application is based upon and claims the benefit of priority from Japanese patent application No. 2008-029911 filed on Feb. 12, 2008, the disclosure of which is incorporated herein in its entirety by reference.

BACKGROUND OF THE INVENTION

The present invention relates to a traffic performance evaluation system in a wireless network and a method thereof and, more particularly, to a traffic performance evaluation system in a tree type multi-hop wireless network of CSMA/CA (Carrier Sense Multiple Access/Collision Avoidance).

RELATED ART

Access control methods include a CSMA/CA method. This method is called Carrier Sense Multiple Access with Collision Avoidance, which is an access method having a function for avoiding competitions when a plurality of users access the same channel. In order to reduce collision probability of data transmission, each transmission node has a random waiting time (i.e. back off time) in this method.

It is known that a collision rate of a frame rapidly increases when traffic increases in IEEE 802.15.4 (ZigBee employs the CSMA/CA method as a PHY (physical) layer and a MAC (Media Access Control) layer) or a wireless LAN employing the CSMA/CA method. Since retransmission of the frame is required each time the collision occurs, it is difficult to estimate a throughput and a delay time, that is, a performance index of a network.

In the case of a multi-hop wireless network, the difficulty rapidly increases unlike a single-hop wireless network. This is because a so-called hidden terminal problem (see Japanese Patent Laid-Open No. 2003-244161 and Japanese Patent Laid-Open No. 2006-197483) becomes significant in the multi-hop wireless network so that frame collision increases. The hidden terminal problem is a problem in which frames transmitted by nodes collide each other because the nodes cannot sense carriers each other. Because of this, decrease in a throughput occurs due to retransmission of the frames.

As technique relevant to the present invention, Japanese Patent Laid-Open No. 2005-210684 discloses a method for estimating a throughput and a delay time of a wireless LAN and Japanese Patent Laid-Open No. 2007-074193 discloses a method for estimating a channel band occupancy rate in stream communication of a wireless LAN. In both of the methods, a packet collision rate in a single hop wireless network of the CSMA/CA method is obtained by calculation.

Japanese Patent Laid-Open No. 2005-210684 and Japanese Patent Laid-Open No. 2007-074193 described above have problems described below. A first problem is not to be able to evaluate a traffic performance in the tree type multi-hop wireless network of the CSMA/CA method. This is because the methods according to the relative technique are based on the single-hop wireless network.

A second problem is not to be able to highly accurately estimate the traffic performance index in the multi-hop wireless network. This is because a serious influence of the hidden terminal problem cannot be considered even though the methods according to the relative technique can be applied to the multi-hop wireless network.

SUMMARY

An exemplary object of the invention is to provide a traffic performance evaluation system in a network and a method thereof capable of evaluating a traffic performance in a tree type multi-hop wireless network of a CSMA/CA method easily and highly precisely.

The system according to an exemplary aspect of the invention is a traffic performance evaluation system in a multi-hop wireless network including a performance index estimation unit regarding the multi-hop wireless network as a combination of a plurality of single-hop wireless networks and estimating a traffic performance index of each node of the network; and a performance index determination unit determining a traffic performance index of the whole multi-hop wireless network based on an estimation result of all the nodes by the performance index estimation unit.

The method according to an exemplary aspect of the invention is a traffic performance evaluation method in a multi-hop wireless network including a first step of regarding the multi-hop wireless network as a combination of a plurality of single-hop wireless networks and estimating a traffic performance index of each node of the network; and a second step of determining a traffic performance index of the whole multi-hop wireless network based on an estimation result of all the nodes by the first step.

The recording medium according to an exemplary aspect of the invention is a recording medium having a program for causing a computer to perform a traffic performance evaluation method in a multi-hop wireless network recorded including a first process of regarding the multi-hop wireless network as a combination of a plurality of single-hop wireless networks and estimating a traffic performance index of each node of the network; and a second process of determining a traffic performance index of the whole multi-hop wireless network based on an estimation result of all the nodes by the first process.

BRIEF DESCRIPTION OF THE DRAWINGS

FIG. 8 is a flowchart showing an exemplary operation of frame transmission in IEEE 802.15.4.

EXEMPLARY EMBODIMENTS

Figure 1:
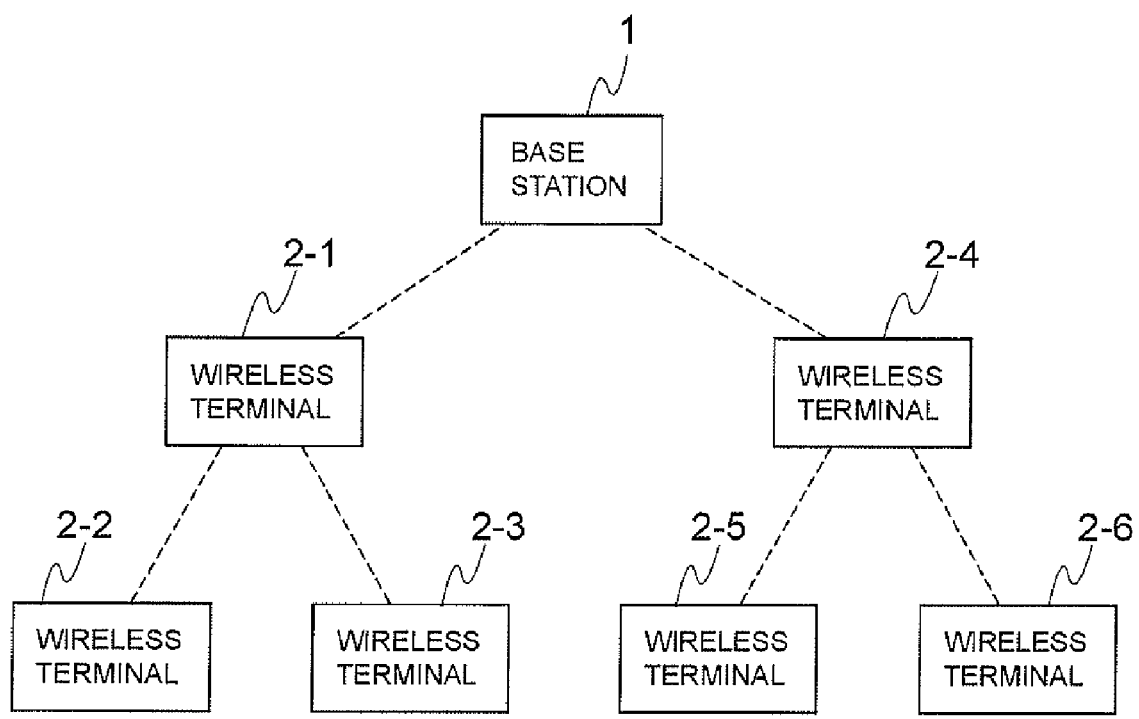
FIG. 1 is a diagram showing an exemplary configuration of a multi-hop wireless network to which the present invention is applied.

Next, exemplary embodiments of the present invention are described in detail with reference to the drawings. FIG. 1 is a diagram showing an exemplary configuration of a multi-hop wireless network to which the present invention is applied. The multi-hop wireless network includes a base station 1 and a plurality of wireless terminals 2-1 to 2-6 (there are six terminals in FIG. 1, but not limited thereto). Radio paths shown as dotted lines are constructed among respective nodes (a generic name for the base station and the wireless terminals) and data are relayed by a multi-hop transfer.

Figure 2:
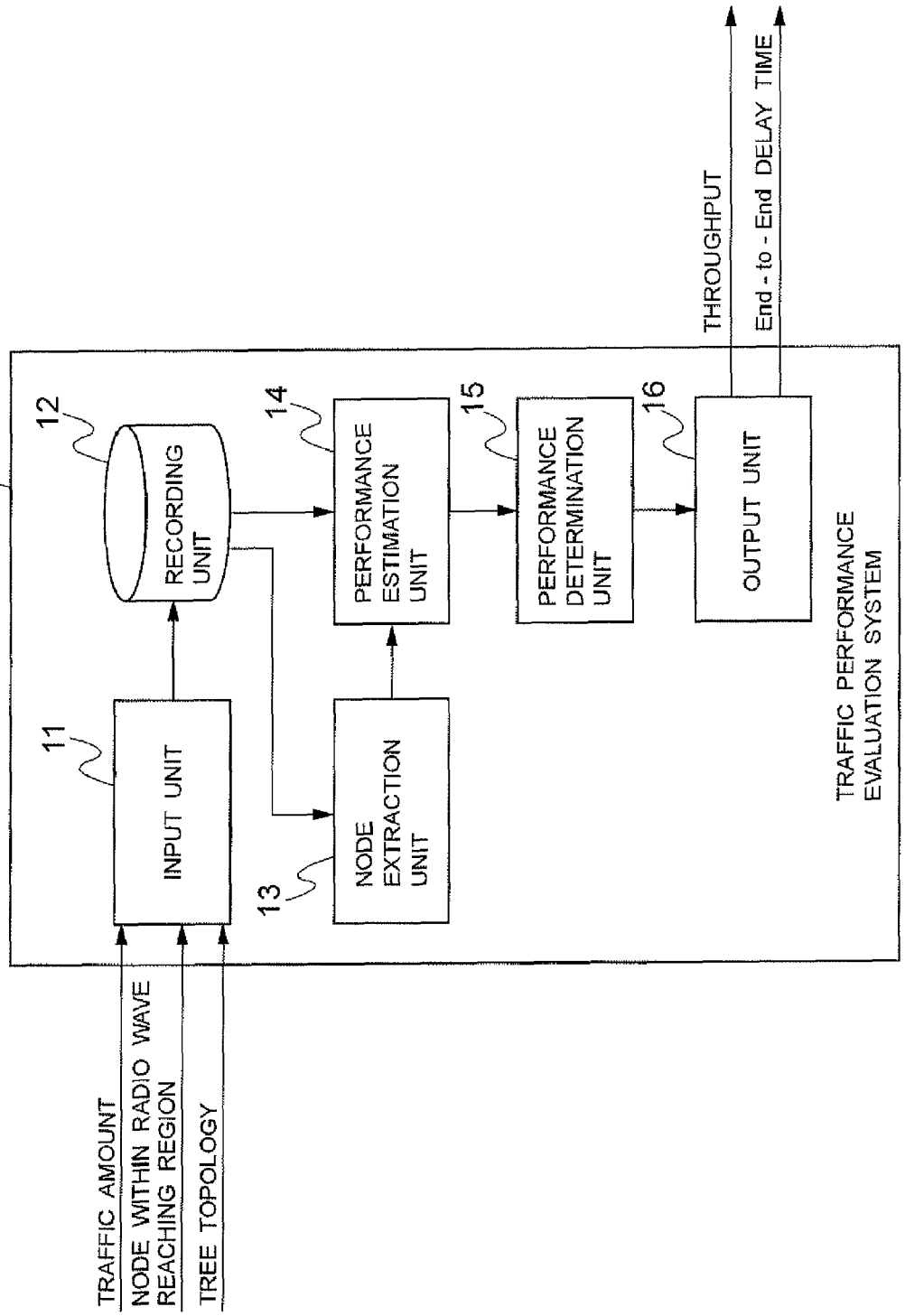
FIG. 2 is a function block diagram of a traffic performance evaluation system according to an exemplary embodiment of the present invention.

FIG. 2 is a function block diagram of a traffic performance evaluation system according to the exemplary embodiment of the present invention. Referring to FIG. 2, a traffic performance evaluation system 10 according to the exemplary embodiment of the present invention includes an input unit 11, a recording unit 12, a node extraction unit 13, a performance estimation unit 14, a performance determination unit 15 and an output unit 16.

The input unit 11 inputs respective information about traffic amount generated at each of the nodes, a node being within a radio wave reaching region of each of the nodes, and parentage of a tree topology. The recording unit 12 stores the information input from the input unit 11.

The node extraction unit 13 reads the information about the node being within the radio wave reaching region of each of the nodes and the parentage of the tree topology from the recording unit 12, extracts a competing node and a hidden node to each of the nodes, and transmits an extraction result to the performance estimation unit 14 The competing node and the hidden node are described in detail later.

The performance estimation unit 14 reads the information about the traffic amount generated at each of the nodes and the parentage of the tree topology from the recording unit 12, calculates traffic amount respectively transmitted by a certain node, a competing node to the certain node and a hidden node to the certain node extracted at the node extraction unit 13, and estimates a throughput and a transmission delay time as a traffic performance index of the certain node.

The performance determination unit 15 receives throughputs and transmission delay times of all the nodes from the performance estimation unit 14, and determines a throughput and an End-to-End delay time of the whole multi-hop wireless network. The output unit 16 outputs a result as a traffic performance index.

Figure 3:
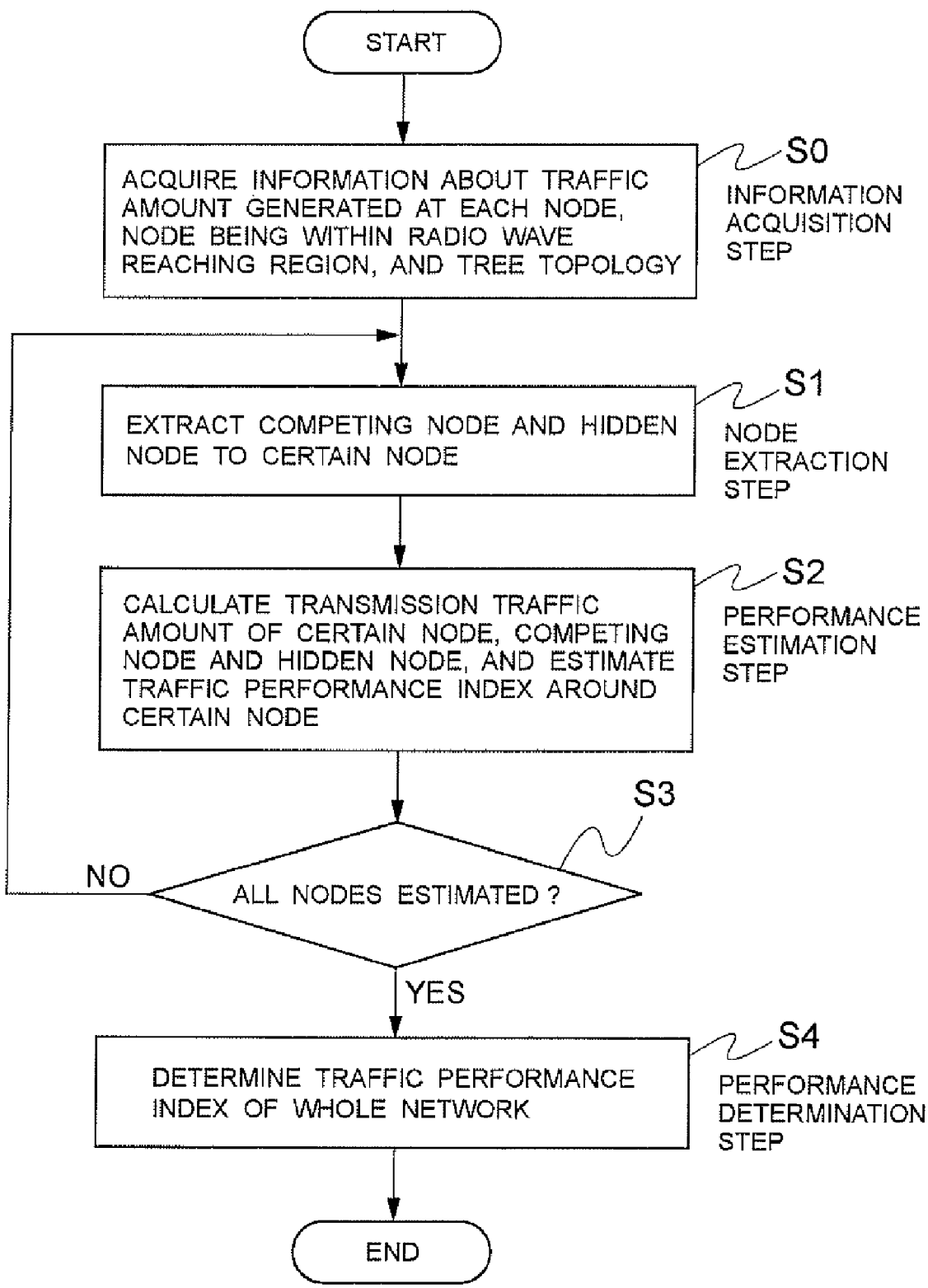
FIG. 3 is a flowchart showing a traffic performance evaluation method according to the exemplary embodiment of the present invention.

FIG. 3 is a flowchart showing an operation of the traffic performance evaluation system according to the exemplary embodiment of the present invention shown in FIG. 2. The present invention regards the multi-hop wireless network shown in FIG. 1 as a combination of a plurality of single-hop wireless networks, respectively estimates the traffic performance indexes around the respective nodes, and determines the traffic performance index of the whole multi-hop wireless network based on the estimation result of all the nodes.

Initially, as shown in an information acquisition step S0, the input unit 11 acquires information about the traffic amount generated at each of the nodes, the node being within the radio wave reaching region of each of the nodes, and the parentage of the tree topology. The acquired information is stored in the recording unit 12.

Next, as shown in a node extraction step S1, the node extraction unit 13 extracts a node (this is called a competing node to a certain node) being within a radio wave reaching region of the certain node and a node (this is called a hidden node to the certain node) in a hidden terminal relation seen from the certain node when the certain node transmits a frame to a parent node or a child node. The node extraction unit 13 extracts these nodes based on the information about the node being within the radio wave reaching region of each of the nodes and the parentage of the tree topology.

Next, as shown in a performance estimation step S2, the performance estimation unit 14 calculates traffic amount (including relay of a frame by the multi-hop transfer) transmitted by a certain node, a competing node to the certain node and a hidden node to the certain node based on the information about the traffic amount generated at each of the nodes and the parentage of the tree topology, and estimates a throughput and a transmission delay time as a traffic performance index around the certain node. After performing steps S1 and S2 described above, to all the nodes, as shown in step S3, the performance determination unit 15 determines the throughput and the End-to-End delay time of the whole multi-hop wireless network based on the throughputs and the delay times of the respective nodes estimated in step S2, as shown in the next performance determination step S4.

Figure 4:
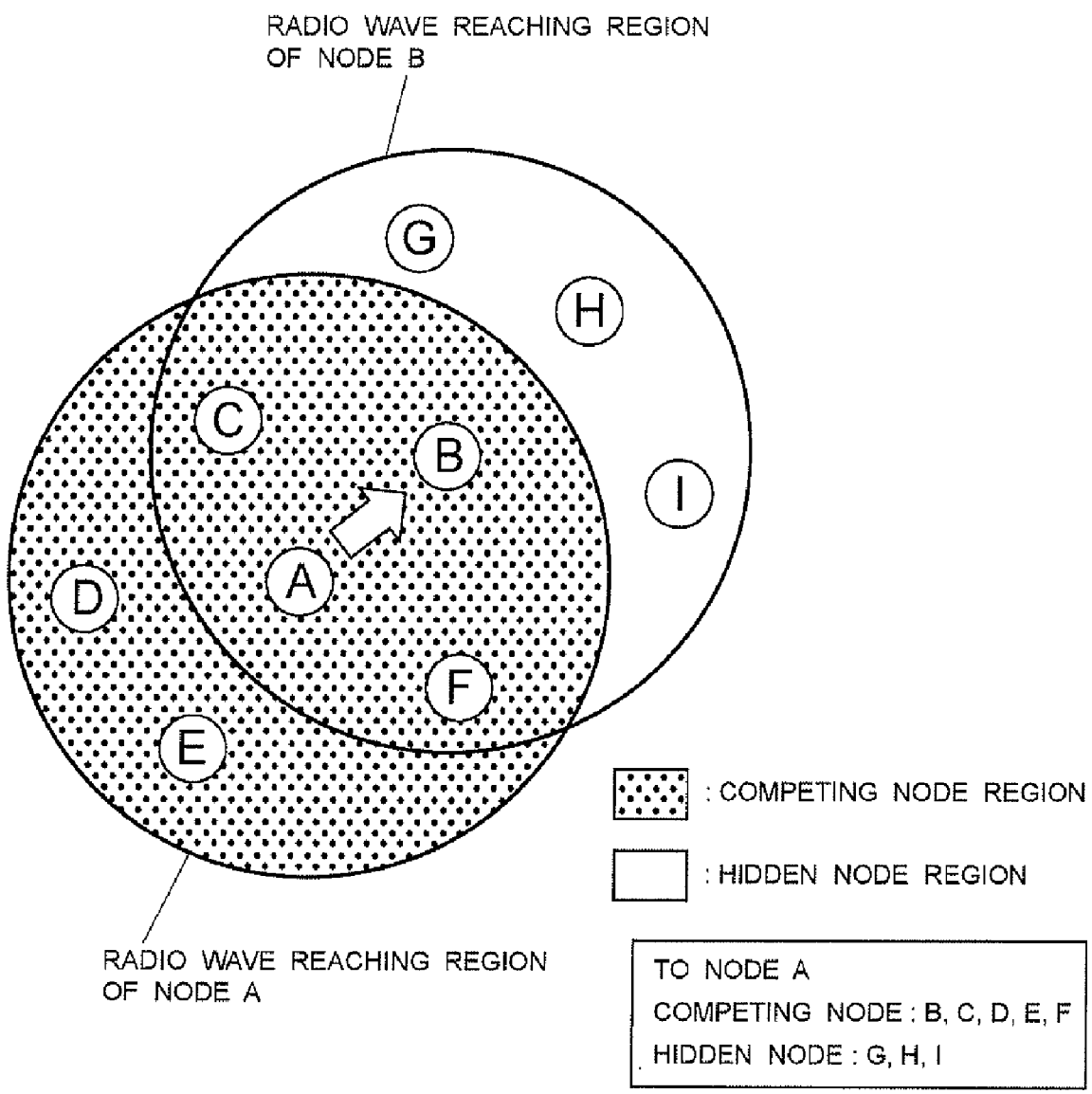
FIG. 4 is a diagram showing a competing node group and a hidden node grope in the exemplary embodiment of the present invention.

A node extraction method of the node extraction step S1 in the node extraction unit 13 is described in detail. FIG. 4 shows competing nodes and hidden nodes to a node A when the node A transmits a frame to a node B. The competing nodes to the node A are within a radio wave reaching region (shown as a shading region) of the node A. In an example of FIG. 4, nodes B, C, D, E and F correspond to the competing nodes.

On the other hand, the hidden nodes to the node A are nodes in the hidden terminal relation when the node A transmits a frame to the node B, and these hidden nodes are within a hidden node region that is a region (shown as a white region) obtained by subtracting the radio wave reaching region of the node A from a radio wave reaching region of the node B. In the example of FIG. 4, nodes G, H and I correspond to the hidden nodes. The above method can extract a competing node and a hidden node to each of the nodes.

Next, a performance estimation method of the performance estimation step S2 in the performance estimation unit 14 is described in detail. It can be considered that a common radio band is shared at an access point and all the terminals of the access point in the single-hop wireless network. However, not all the nodes share a common radio band in the multi-hop wireless network even though all the nodes use the same radio channel because of a widespread network.

Thus, it is assumed that the respective nodes share the common radio band only with the competing nodes and the multi-hop wireless network is a combination of a plurality of the single-hop wireless networks. A throughput and a transmission delay time within a radio wave reaching region of a certain node are estimated on this assumption.

In FIG. 4, the competing nodes B, C, D, E and F to the node A compete in a frame transmission with the node A based on the CSMA/CA method. However, the hidden nodes G, H and I to the node A cannot be expected to operate based on the CSMA/CA method because a radio wave from the node A does not reach them.

Here, if it is considered that transmission frames of the node A and the hidden nodes always collide randomly with each other not only when the transmission begins but also during the transmission, the frame collision due to the hidden terminals seems to be a phenomenon similar to a CRC (Cyclic Redundancy Check) frame error at node A.

The above difference between influences of the competing nodes and the hidden nodes to the node A is considered for estimating the traffic performance index so that highly precise traffic performance evaluation becomes possible.

Next, a performance determination method of the performance determination step S3 in the performance determination unit 15 is described in detail. A minimum value is selected as the throughput of the whole multi-hop wireless network from the throughputs of the respective nodes estimated in the performance estimation step S2 in the performance estimation unit 14. A maximum value is also selected as the End-to-End delay time from values obtained by adding all the transmission delay times of the nodes on a path between each terminal and the base station (between the terminals is possible).

The output unit 16 obtains the throughput and the End-to-End delay time of the whole multi-hop wireless network as a performance index for the traffic evaluation of the whole network.

A specific example in the exemplary embodiment of the present invention is described in detail below with reference to FIGS. 5 to 8. Described below is an example of information about the traffic amount generated at each of the nodes, the node being within the radio wave reaching region of each of the nodes and the parentage of the tree topology, which are required in the information acquisition step S0 in the input unit 11.

Figure 5:
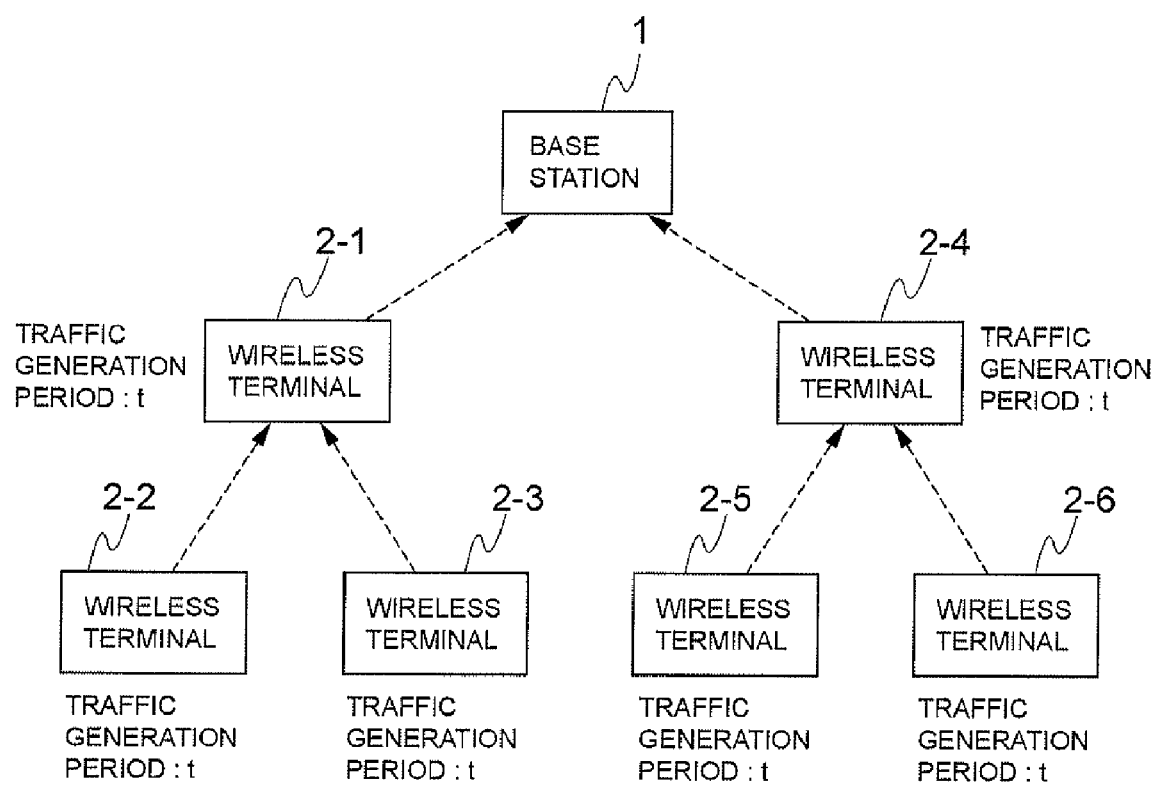
FIG. 5 is a diagram showing an example of a tree topology for illustrating a specific example in the exemplary embodiment of the present invention.

In a tree topology of FIG. 5 (it is the same as the tree topology in FIG. 1), it is assumed that traffic amount generated at all the wireless terminals 2-1 to 2-6 is the same (a traffic generation period is t) and all the wireless terminals 2-1 to 2-6 transmit frames to the base station 1 (the base station 1 does not transmit a frame).

Figure 6:
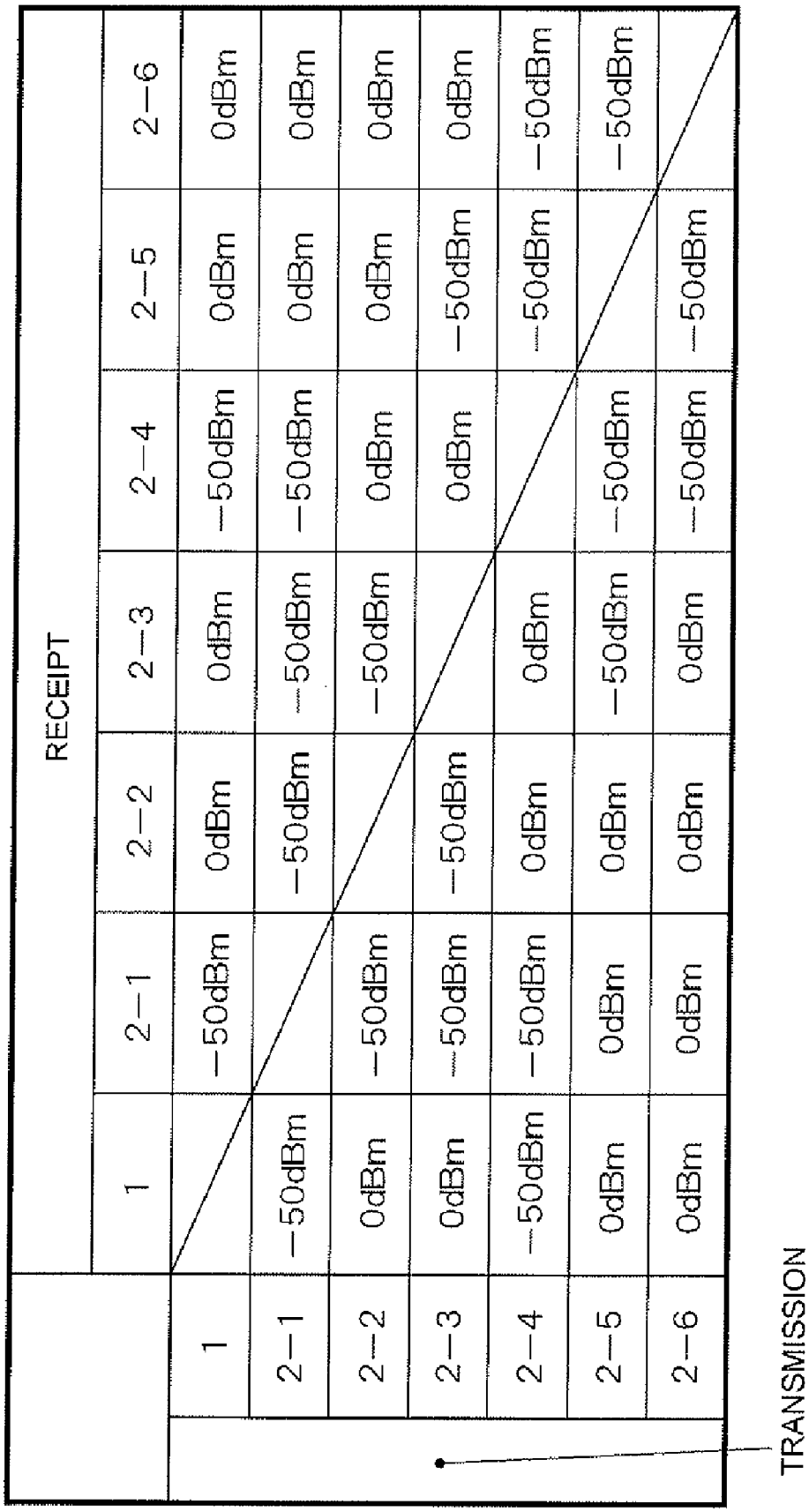
FIG. 6 is a chart listing receiving strength in the tree topology in FIG. 5.

Additionally, FIG. 6 shows a receiving strength list between the nodes as information of the node being within the radio wave reaching region of each of the nodes. Here, simple values are used so that receiving strength in the case where a node is within a radio wave reaching region of a certain node is −50 dBm and receiving strength in the case where a node is not within the radio wave reaching region is 0 dBm.

In order to show a basic operation of the present invention, it is assumed that, in the example, the traffic amount generated at each of the nodes is the same and bidirectional communication is possible between the certain node and a node being within a radio wave reaching region thereof only in a traffic direction (up) from the wireless terminal to the base station. However, the present invention is not limited thereto.

A competing node and a hidden node are extracted based on the information in the node extraction step S1 in the node extraction unit 13. For example, in the case of the wireless terminal 2-3, competing nodes are the wireless terminals 2-1, 2-2 and 2-5 as shown in FIG. 6.

Hidden nodes can be extracted according to a next procedure. Four nodes of the base station 1, the wireless terminals 2-2, 2-3 and 2-4 are within the radio wave reaching region of the wireless terminal 2-1 which is a next hop of the wireless terminal 2-3. Nodes obtained by excluding its own node and the competing nodes from the four nodes are hidden nodes. That is, the hidden nodes are two nodes of the base station 1 and the wireless terminal 2-4. In the example, the base station 1 does not transmit a frame, while it must be a hidden terminal.

Figure 7:
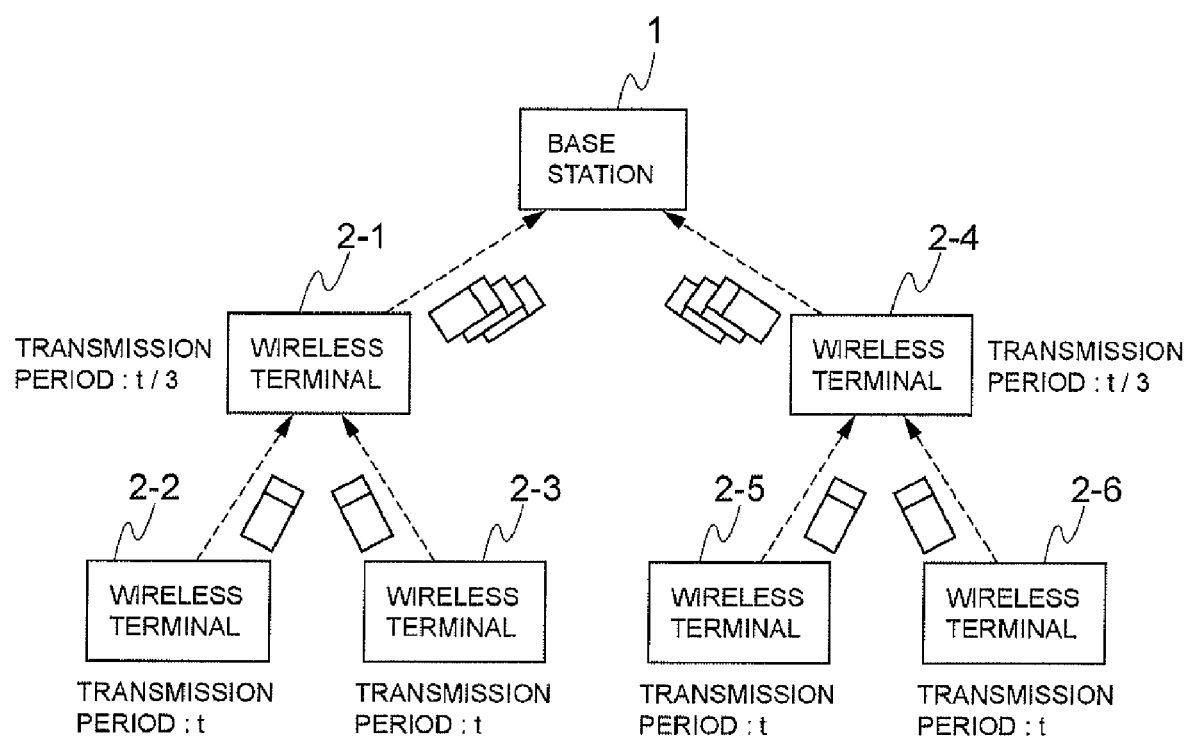
FIG. 7 is a diagram showing transmission traffic amount in the tree topology in FIG. 5.

In the performance estimation step S2 in the performance estimation unit 14, the transmission traffic amount (a transmission period of a frame) of the respective nodes is initially calculated. As shown in FIG. 7, it is necessary for the wireless terminals 2-1 and 2-4 to transfer received frames from the wireless terminals of the child nodes to the base station 1 besides frames generated at their own nodes. Here, a transmission period of the wireless terminals 2-2, 2-3, 2-5 and 2-6 is t and a transmission period of the wireless terminals 2-1 and 2-4 is t/3. Thus, the transmission period of each of the nodes can be expressed by using the traffic generation period of each of the nodes.

An example of a method for estimating the throughput of each of the nodes is described. In this example, it is assumed that a wireless standard employs IEEE 802.15.4. A frame collision rate $c_i$ at a node i can be expressed by Formula 1, where i and j are node numbers, $t_j$ is a transmission period of a node j, and v is a band availability rate showing a ratio of unused radio band around the node i.

$$c_i = 1 - \prod_{j \neq i} \left(1 - \frac{1}{vt_j + 1}\right) \quad \text{(Formula 1)}$$

A retransmission rate $f_i$ at the node i can be expressed by Formula 2 with using the frame collision rate $c_i$, where $e_i$ is a frame error rate at the node i.

$$f_i = 1 - (1 - e_i)(1 - c_i) \quad \text{(Formula 2)}$$

A factor of a frame error can be regarded as the CRC frame error and a frame collision due to a hidden terminal Thus, the frame error rate $e_i$ can be expressed by Formula 3, where $g_i$ is the CRC frame error rate at the node i and $h_i$ is a frame collision rate due to a hidden terminal.

$$e_i = 1 - (1 - g_i)(1 - h_i) \quad \text{(Formula 3)}$$

If it is considered that the hidden node cannot be expected to operate based on the CSMA/CA, the frame collision rate $h_i$ due to the hidden terminal can be expressed by Formula 4, where $s_i$ is one frame transmission time of the node i and $t_i$ is a transmission period of the node i.

$$h_i = 1 - \prod_{B \in i\text{'s hidden terminals}} \left(1 - \frac{2s_i}{t_i}\right) \quad \text{(Formula 4)}$$

Meanwhile, a band usage rate $u_i$ around the node i can be expressed by Formula 5 with using the retransmission rate $f_i$.

$$u_i = s_i / t_i (1 - f_i) \quad \text{(Formula 5)}$$

On the other hand, the band availability rate v can be expressed by Formula 6 with using the band usage rate $u_i$.

$$v = 1 - \sum_{i=1}^{n} u_i \quad \text{(Formula 6)}$$

Here, a minimum traffic generation period $t_{min}$ with a band usage rate being a threshold value or less can be obtained by setting the threshold value of a certain upper limit to the band usage rate $u_i$. This corresponds to a maximum permissible transmission traffic amount around a certain node. A throughput $T_i$ of the node i can be obtained by Formula 7 where B is the number of bits per one frame.

$$T_i = B / t_{min} \quad \text{(Formula 7)}$$

Next, an example of a method for estimating the transmission delay time of each of the nodes is described. The transmission delay time can be obtained by using the retransmission rate $f_i$ at the node i calculated above.

Referring to FIG. 8, an exemplary operation of a frame transmission according to IEEE 802.15.4 is shown. In the flowchart, if a channel is available (Yes in step S12) after a back off time passes (step S11), a frame is transmitted (step S13). However, if the channel is not available (No in step S12), another back off time passes (step S14). After that, if the channel is available (Yes in step S15), the frame is transmitted (step S13), while if the channel is not available (No in step S15), another back off time is waited (step S16). If an ACK (Acknowledgement) is received from the receiving node (step S20) after the operations are repeated (steps S17 to S19) for the frame transmission (step S13), the frame transmission is ended.

In these frame transmission operations, a transmission delay time $D_i$ of the node i having the frame collision and the frame error considered can be expressed by Formula 8, where $p_k$ is probability of transmitting a frame after a k-th back off (k=1, 2, 3, 4), q is probability of not transmitting the frame after a fourth back off, $D_k$ is a transmission delay time in the case of transmitting the frame after the k-th back off, $D_q$ is a transmission delay time in the case of not being able to transmit the frame after the fourth back off, and $D_s$ is a transmission delay time until the frame transmission.

$$D_i=D_s/(1-q)(1-f_i) \quad \text{(Formula 8)}$$

$D_s$ can be expressed by Formula 9.

$$D_s=p_1 D_1+p_2 D_2+p_3 D_3+p_4 D_4+p_q D_q \quad \text{(Formula 9)}$$

As described above, the throughputs and the transmission delay times of the respective nodes can be calculated.

The traffic performance index of the whole multi-hop wireless network is determined in the performance determination step S3 in the performance determination unit 15. A throughput T is a minimum value among the throughputs $T_i$ of the respective nodes. An End-to-End delay time $\Sigma D$ is a maximum value among values obtained by adding the transmission delay times $D_i$ of the nodes passed along a tree path between each of the wireless terminals and the base station.

In the above example, both of the throughput and the delay time are calculated as the traffic performance index of the whole network, however, any one of these may be calculated.

It is apparent that an operation procedure is previously stored in a recording medium as a program and each operation in the exemplary embodiment and the specific example can be performed by causing a computer to read the operation procedure. Additionally, the present invention is not limited to IEEE 802.15.4 (a PHY and a MAC layers of ZigBee) and it can be applied to a wireless communication method with using the CSMA/CA method such as a wireless LAN.

A first exemplary advantage according to the invention is to be able to evaluate a traffic performance easily in the tree type multi-hop wireless network of the CSMA/CA method. This is because the traffic performance around each of the nodes is evaluated by regarding the multi-hop wireless network as a combination of a plurality of single-hop wireless networks and the traffic performance index of the whole multi-hop wireless network is determined based on the result.

A second exemplary advantage according to the invention is to highly precisely estimate the traffic performance index in the multi-hop wireless network. This is because the hidden node to each of the nodes is extracted and an influence of the hidden terminal problem is considered in the traffic performance evaluation of the multi-hop wireless network.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A traffic performance evaluation system in a multi-hop wireless network comprising:
   a performance index estimation means for regarding the multi-hop wireless network as a combination of a plurality of single-hop wireless networks and estimating a traffic performance index of each node of the network; and
   a performance index determination means for determining a traffic performance index of the whole multi-hop wireless network based on an estimation result of all the nodes which is obtained by the performance index estimation means;
   wherein the performance index estimation means comprises:
   an extraction means for extracting a first node being within a radio wave reaching region of each of the nodes and a second node in a hidden terminal relation to each of the nodes based on information about the nodes being within the radio wave reaching region of each of the nodes and a network topology; and
   an estimation means for respectively calculating a transmission traffic amount of each of the nodes, a transmission traffic amount of the first node and a transmission traffic amount of the second node to each of the nodes, and estimating the traffic performance index of each node.

2. The system according to claim 1, wherein the performance index estimation means estimates the traffic performance index assuming that each of the nodes shares a common radio channel only with the first node.

3. The system according to claim 2, wherein the performance index estimation means estimates the traffic performance index considering an influence of the second node.

4. The system according to claim 1, wherein the traffic performance index of each node is at least one of a throughput and a transmission delay time.

5. A non-transitory recording medium recording a program for causing a computer to perform a traffic performance evaluation method in a multi-hop wireless network, wherein the program comprises:
   a first process of regarding the multi-hop wireless network as a combination of a plurality of single-hop wireless networks and estimating a traffic performance index of each node of the network; and
   a second process of determining a traffic performance index of the whole multi-hop wireless network based on an estimation result of all the nodes which is obtained by the first process,
   wherein the first process comprises:
   a process of extracting a first node being within a radio wave reaching region of each of the nodes and a second node in a hidden terminal relation to each of the nodes based on information about the nodes being within the radio wave reaching region of each of the nodes and a network topology; and
   a process of respectively calculating a transmission traffic amount of each of the nodes, a transmission traffic amount of the first node and a transmission traffic amount of the second node to each of the nodes, and estimating the traffic performance index of each node.

6. The non-transitory recording medium according to claim 5, wherein, in the first process, the traffic performance index is estimated assuming that each of the nodes shares a common radio channel only with the first node.

7. The non-transitory recording medium according to claim 6, wherein, in the first process, the traffic performance index is estimated with an influence of the second node being considered.

8. The non-transitory recording medium according to claim 5, wherein the traffic performance index of each node is at least one of a throughput and a transmission delay time.

* * * * *